Feb. 28, 1967   H. W. HART   3,306,262
POULTRY WATERING DEVICE
Filed Oct. 11, 1965
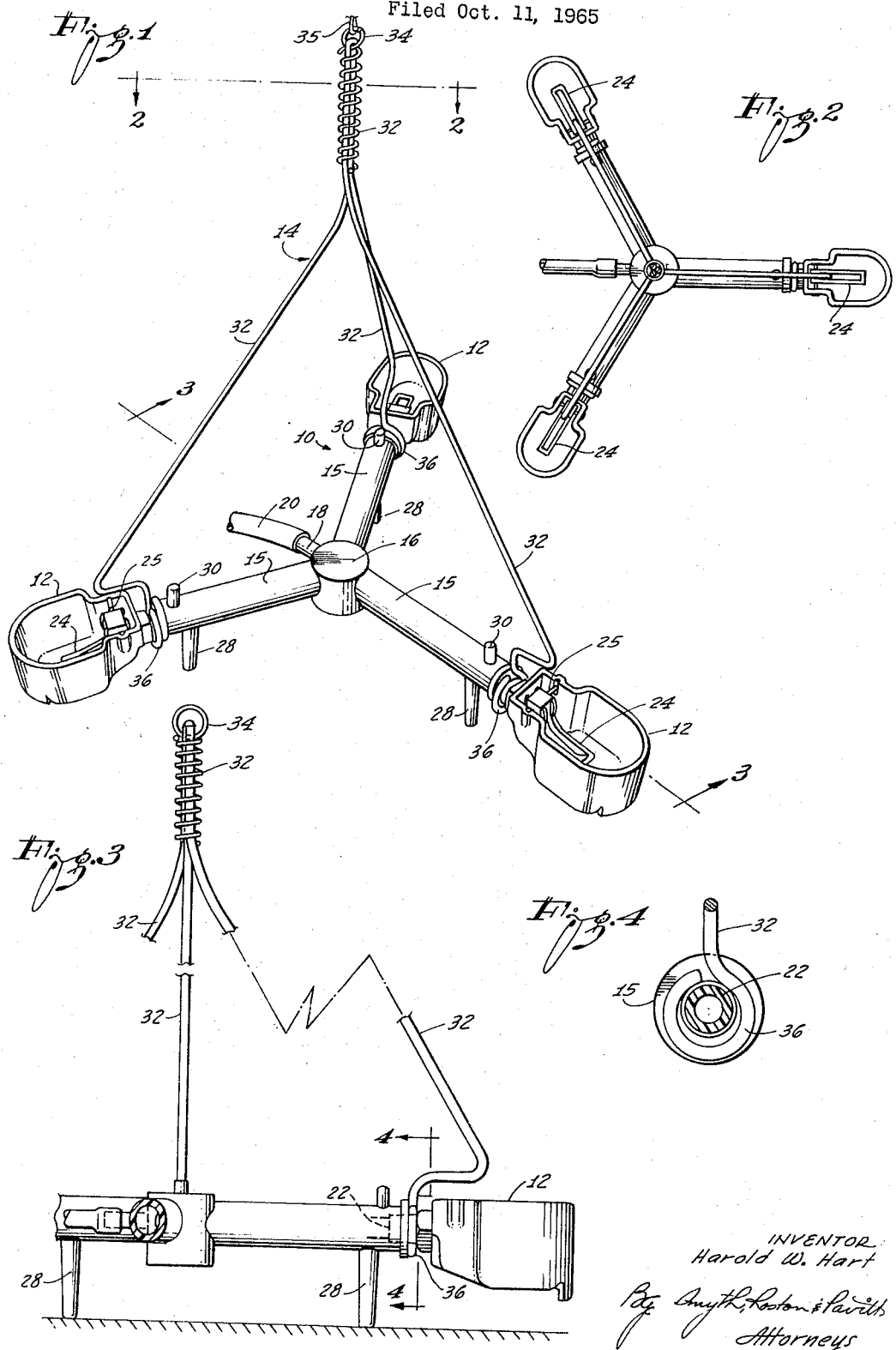
INVENTOR
Harold W. Hart
Attorneys

United States Patent Office 3,306,262
Patented Feb. 28, 1967

3,306,262
POULTRY WATERING DEVICE
Harold W. Hart, Glendale, Calif., assignor to H. W. Hart Manufacturing Company, Glendale, Calif., a corporation of California
Filed Oct. 11, 1965, Ser. No. 494,660
7 Claims. (Cl. 119—72)

This invention relates to a device for attachment to a water source to provide drinking water for fowls or the like and, more particularly, relates to a compact conduit assembly having a plurality of peripheral outlets equipped with drinking cups.

Newly born baby chicks must have an ample supply of drinking water and the water level must be close to the floor. The water must be sufficiently accessible for the baby chicks to drink at will but not so accessible as to permit sloshing of the water onto the chicks or onto the floor area. In large scale commercial practice it is highly desirable to provide the baby chicks with a plurality of distributed drinking cups exposing only small areas of water with the drinking cups connected to a suitable low pressure water source and with each drinking cup provided with suitable control means for automatic water replenishment.

Drinking cups of this type are disclosed in my Patent No. 2,845,046, issued July 29, 1958 and entitled Water Supplying Device for Poultry. More recently a drinking cup has been developed which incorporates a control valve operated by a float in the cup and when the chicks grow into young chickens the float is replaced by a trigger which the chickens learn to operate by their beaks.

The present invention relates specifically to a conduit assembly adapted for connection to a water supply and equipped with suitable drinking cups which preferably are of the newly developed type.

One problem encountered in the use of such a compact conduit assembly is the tendency of the baby chicks to perch on the unit at or close to the drinking cups with consequent possibility of fouling of the water in the cups. Another problem resides in the fact that while the drinking cups must be at a low level for newly born chicks, as the chicks grow in size the cups must be raised accordingly to keep the cups sanitary.

The invention meets both of these problems by providing the conduit assembly with what may be termed a dual purpose spider. The spider serves as a guard to keep chicks from perching on the unit near the drinking cups, and, in addition, serves as means for suspending the conduit assembly at successively higher levels above the floor as the chicks grow up.

The preferred practice of the invention is characterized by a simple construction that is efficient for its purpose and at the same time is suitable for mass production at exceptionally low fabrication cost. The conduit assembly comprises a plastic array of radial conduit arms and the individual drinking cups are provided with nipples that screw into the outer ends of the conduit arms. The spider comprises a plurality of wires which incline downward and radially outward from a center to the regions of the respective cups. The lower ends of the spider wires are formed into loops to embrace the nipples of the cups so that the individual wires may be connected to the conduit assembly by simply inserting the nipples of the drinking cups through the wire loops prior to assembling the drinking cups to the ends of the conduit arms. Preferably each wire of the spider extends radially outward sufficiently to overhang the inner edge of the corresponding cup to keep chicks from perching thereon.

In the preferred practice of the invention, the arms of the conduit assembly have individual downwardly extending projections that initially serve as legs to support the array on the floor with the drinking cups close to the floor but out of contact with the floor. Subsequently, the spider is suspended from overhead structure to hold the conduit assembly at successive higher levels as the chicks grow in size.

The various features and advantages of the invention may be understood from the following detailed description and the accompanying drawing.

In the drawing, which is to be regarded as merely illustrative:

FIG. 1 is a perspective view of the presently preferred embodiment of the invention;

FIG. 2 is a plan view of the embodiment on a somewhat smaller scale;

FIG. 3 is a fragmentary view on a larger scale partly in side elevation and partly in section; and FIG. 4 is a fragmentary transverse section taken along the line 4—4 of FIG. 3 to show how a wire loop of a leg of the spider embraces a nipple of a drinking cup.

The principal parts of the preferred embodiment of the invention shown in the drawing includes a conduit structure or array, generally designated 10, a plurality of drinking cups 12 completing what may be termed a conduit assembly, the cups being distributed around the periphery of the conduit arrays, and an upwardly extending spider, generally designated 14. The conduit structure 10 comprises a plurality of conduit arms 15 extending radially outward from a hollow body or mainfold 16, the manifold being provided with a nipple 18 for connection to a low pressure water source (not shown) by a suitable hose 20. Each of the drinking cups 10 is formed with a nipple 22 (FIG. 3) which is threaded and which screws into the outer end of a conduit arm 15 for mounting the drinking cup on the arm.

The flow of water into each drinking cup 12 is controlled by a concealed valve which in turn is controlled by a buoyant plastic arm 24 which functions in the manner of a float. The buoyant arm 24 responds to changes in the water level in the plastic cup and causes the concealed valve to open as necessary to maintain a predetermined water level in the cup. In the construction shown, each of the buoyant arms 24 is pivoted on a transverse pin 25 and actuates a plunger (not shown) which is the operating member of the corresponding valve.

Preferably, each of the conduit arms 15 is formed with an integral downwardly extending projection 28 to serve as a support leg, the three legs being dimensioned in length to keep the drinking cups 12 out of contact with the floor but close to floor level. Preferably, each of the conduit arms 15 is further formed with an integral upward projection 30 near its outer end to tend to keep chicks from perching thereon.

The spider 14 may comprise a plurality of wires corresponding to the plurality of conduit legs 15, there being three such wires 32 forming the three legs of the spider. The three wires 32 are interconnected at the top, the wires being held together by a relatively fine wire 32 wrapped helically as shown. In the construction shown two of the legs 32 of the spider are formed by a single wire which is bent back on itself to engage a small ring 34 to which a suitable cord or wire 35 may be attached for suspending the spider from overhead structure.

Each of the wires 32 is inclined downward to the region of the corresponding drinking cup 12, for example at an angle from horizontal on the order of 45° and thus overhangs the outer end of the corresponding conduit arm 15 at sufficiently close spacing from the conduit arm to serve as a guard to keep baby chicks from perching thereon. Preferably each of the downwardly inclined wires 32 extends radially outwardly sufficiently to overhang the inner edge of the corresponding cup and thus prevents chicks from perching on the inner edge of the cup. Each wire 32 may be bent or offset as shown to clear the rear edge of the corresponding drinking cup and the lower end of each wire may be formed into a loop 36 to surround the nipple 22 of the corresponding cup.

The manner in which the selected embodiment serves its purpose may be readily understood from the foregoing description. Initially the conduit assembly rests on the floor supported by the three legs 28 at a low level for use by new born chicks. The buoyant control arms 24 operate automatically to keep the drinking cups 12 replenished with water, the cups being low enough for access by the baby chicks but high enough to keep the chicks from contaminating the water. Any tendency of the chicks to perch on the conduit arms 15 adjacent the cups 12 or to perch on the inner edges of the cups is prevented by the downwardly inclined wire arms 32 of the spider 14. The upward projections 30 further discourage perching of the baby chicks on the outer ends of the conduit arms.

When the baby chicks grow somewhat in size a string or wire 35 is connected to overhead structure and is connected to the upper end of the spider 14 for the purpose of suspending the conduit assembly above floor level, the cups 12 being low enough for access by a growing chick but high enough to prevent contamination of the water by the chick. It is a simple matter to shorten the wire or cord 35 intermittently to raise the cups 12 in accord with the growing size of the chicks. When the chickens are old enough, the floats or buoyant control arms may be replaced with triggers that are operated by pecks by the chickens.

In the preferred construction the conduit structure is made of molded plastic with parts bonded together and may be produced at low cost. The drinking cups 12 are made of suitable plastic and the buoyant control arms 24 may be made of a plastic of suitably low specific gravity. The wires 32 of the spider 14 may be formed inexpensively by automatic machinery to keep the cost of the spider exceedingly low. The cost of assembling the spider 14 to the conduit assembly is low because it is a simple matter to insert each of the drinking cup nipples 22 through a wire loop 36 in the course of mounting the drinking cup on the conduit assembly.

My description in specific detail of the selected embodiment of the invention will suggest various changes, substitutions and other departures from my disclosure within the spirit and scope of the appended claims.

I claim:

1. A drinking water device for fowls or the like, comprising:
   a compact structure comprising an array of substantially horizontal conduits for connection to a water source said conduits having distributed water outlets;
   drinking cups connected to said outlets to cooperate with the conduit structure to form an assembly to rest on a floor for supplying water to young fowls; and
   suspension means including wire-like members above the assembly and connected thereto to suspend the assembly above floor level for older fowls;
   said wire-like members extending diagonally downwardly to the regions of the respective cups to prevent fowls from perching on the conduit structure adjacent the cups, the wire-like members of the suspension means at least partially overhanging said water outlets to prevent the fowls from perching on the water outlets.

2. A combination as set forth in claim 1 in which said horizontal conduits have short downward projections unitary therewith to serve as legs to support the assembly on the floor.

3. A drinking water device for fowls, comprising:
   a conduit array for connection to a water source said array having a plurality of outwardly extending arms;
   drinking cups mounted on the outer ends of the respective arms to receive water therefrom; and
   a spider to serve the dual purpose of preventing chicks from perching on the array adjacent the cups and of suspending the array above floor level when desired;
   said spider having radial legs corresponding to the arms of the array, said legs being interconnected in a region above said center and inclining downward from the region to the outer ends of the arms of the array;
   the legs of the spider being anchored to the outer ends of the arms of the array at angles to keep the chicks from perching on the arms of the array.

4. A combination as set forth in claim 3 in which lower portions of the spider legs overhang the corresponding cups and the lower ends of the spider legs are bent inwardly to clear the cups.

5. A combination as set forth in claim 3 in which:
   the cups have nipples by means of which they are mounted on the ends of the conduit arms; and
   in which the lower ends of the spider legs are formed with loops to embrace the nipples whereby the spider may be assembled to the conduit array by inserting the nipples into the loops before connecting the cups to the conduit arms.

6. A drinking water device for chicks, comprising:
   a unitary conduit array for connection to a water source, said array having a plurality of arms radiating from a center with outlet openings at the outer ends of the arms;
   drinking cups connected to the outer ends of the arms respectively, each of said cups having a nipple removably inserted into the corresponding outlet opening;
   at least some of said conduit arms having downward projections near their outer ends to serve as legs to support the conduit array on a floor for use by young fowls, said legs being dimensioned to maintain the drinking cups out of contact with the floor; and
   a spider to suspend the array at an elevated position for older fowls, said spider comprising a plurality of wires corresponding to the plurality of conduit arms, the plurality of wires being interconnected above the center of the conduit array;
   said wires inclining downward to the nipples of the respective cups to keep chicks from perching on the conduit arms adjacent the cups, said wires being formed with loops at their lower ends embracing the nipples to connect the spider to the conduit array;
   lower portions of the wires overhanging the corresponding cups.

7. A combination as set forth in claim 6 in which each of the conduit arms has at least one upward projection unitary therewith near its outer end to discourage perching of fowls thereon.

References Cited by the Examiner
UNITED STATES PATENTS

| | | | |
|---|---|---|---|
| 2,654,346 | 10/1953 | Goff | 119—81 |
| 2,921,556 | 1/1960 | Nilsen | 119—74 |

SAMUEL KOREN, *Primary Examiner.*

HUGH R. CHAMBLEE, *Examiner.*